US012673825B2

(12) United States Patent
Gao et al.

(10) Patent No.: US 12,673,825 B2
(45) Date of Patent: Jul. 7, 2026

(54) ORDER PROCESSING METHOD, APPARATUS, DEVICE, SYSTEM, MEDIUM, AND PRODUCT

(71) Applicant: HAI ROBOTICS CO., LTD., Shenzhen (CN)

(72) Inventors: Yurong Gao, Shenzhen (CN); Yao Chen, Shenzhen (CN)

(73) Assignee: HAI ROBOTICS CO., LTD., Shenzhen (CN)

( * ) Notice: Subject to any disclaimer, the term of this patent is extended or adjusted under 35 U.S.C. 154(b) by 375 days.

(21) Appl. No.: 18/475,490

(22) Filed: Sep. 27, 2023

(65) Prior Publication Data

US 2024/0017926 A1 Jan. 18, 2024

Related U.S. Application Data

(63) Continuation of application No. PCT/CN2022/079428, filed on Mar. 4, 2022.

(30) Foreign Application Priority Data

Mar. 31, 2021 (CN) ........................ 202110350668.9

(51) Int. Cl.
*B07C 5/36* (2006.01)
*B65G 1/137* (2006.01)
(Continued)

(52) U.S. Cl.
CPC .............. *B65G 1/1378* (2013.01); *B07C 5/36* (2013.01); *G06Q 10/087* (2013.01); *G06Q 30/0635* (2013.01)

(58) Field of Classification Search
CPC ........... B65G 1/1378; B07C 5/36; B07C 3/02; G06Q 10/087; G06Q 30/0635; G06Q 10/06316; G06Q 10/06315
See application file for complete search history.

(56) References Cited

U.S. PATENT DOCUMENTS

2019/0354920 A1* 11/2019 Farias .................. G06Q 10/087
2020/0302391 A1 9/2020 Li
(Continued)

FOREIGN PATENT DOCUMENTS

CN 107274246 A 10/2017
CN 109214729 A 1/2019
(Continued)

OTHER PUBLICATIONS

International Search Regort for PCT/CN2022/079428.
(Continued)

*Primary Examiner* — Rodney A Butler
(74) *Attorney, Agent, or Firm* — Slater Matsil, LLP

(57) ABSTRACT

Embodiments of the present disclosure provide an order processing method, apparatus, device, system, medium, and product. The method includes: obtaining a target order to be processed and determining a quantity of types of goods in the target order; dividing the target order into a plurality of sub-orders according to the quantity of types of goods and assigning different workstations for the sub-orders; and sending the sub-orders for which the workstations have been assigned to the corresponding workstations for processing.

21 Claims, 5 Drawing Sheets

(51) Int. Cl.

| | |
|---|---|
| ***G06Q 10/08*** | (2024.01) |
| ***G06Q 10/087*** | (2023.01) |
| ***G06Q 30/06*** | (2023.01) |
| ***G06Q 30/0601*** | (2023.01) |

(56) References Cited

U.S. PATENT DOCUMENTS

| | | | |
|---|---|---|---|
| 2020/0317450 | A1 | 10/2020 | Parrott |
| 2021/0073722 | A1 | 3/2021 | Hu |

FOREIGN PATENT DOCUMENTS

| | | | |
|---|---|---|---|
| CN | 109359902 | A | 2/2019 |
| CN | 109656243 | A | 4/2019 |
| CN | 110147972 | A | 8/2019 |
| CN | 111069061 | A | 4/2020 |
| CN | 111738654 | A | 10/2020 |
| CN | 111932186 | A | 11/2020 |
| CN | 112085453 | A | 12/2020 |
| CN | 113077213 | A | 7/2021 |
| JP | 2003345439 | A | 12/2003 |
| JP | 2005047663 | A | 2/2005 |
| JP | 2010531796 | A | 9/2010 |
| JP | 2020083654 | A | 6/2020 |
| JP | 2020527524 | A | 9/2020 |
| JP | 2021506703 | A | 2/2021 |
| JP | 2021034670 | A | 3/2021 |
| JP | 2021519473 | A | 8/2021 |
| TW | I368593 | B | 7/2012 |
| WO | WO2019228474 | A1 | 12/2019 |
| WO | WO2020165837 | A2 | 12/2020 |

OTHER PUBLICATIONS

European Search Report dated Sep. 2, 2024, Application No. 22778474.1.

First Office Action of Japanese Application No. 2023-560137, dated Oct. 1, 2024.

Japanese Decision of Rejection dated Mar. 11, 2025, Application No. 2023-560137.

* cited by examiner

S201

Obtain a target order to be processed and determine a quantity of types of goods in the target order

S202

Determine the quantity of types of goods as a quantity of sub-orders

S203

Divide the target order into a plurality of corresponding sub-orders according to the quantity of sub-orders

S204

Assign different workstations for the sub-orders

S205

Send the sub-orders for which the operating workstations have been assigned to the corresponding workstations for processing

S206

Receive sorting information of a sub-order for which picking has been performed sent by a first workstation

S207

Control, according to the sorting information of the sub-order for which picking has been performed, a corresponding robot to complete delivery of picked goods

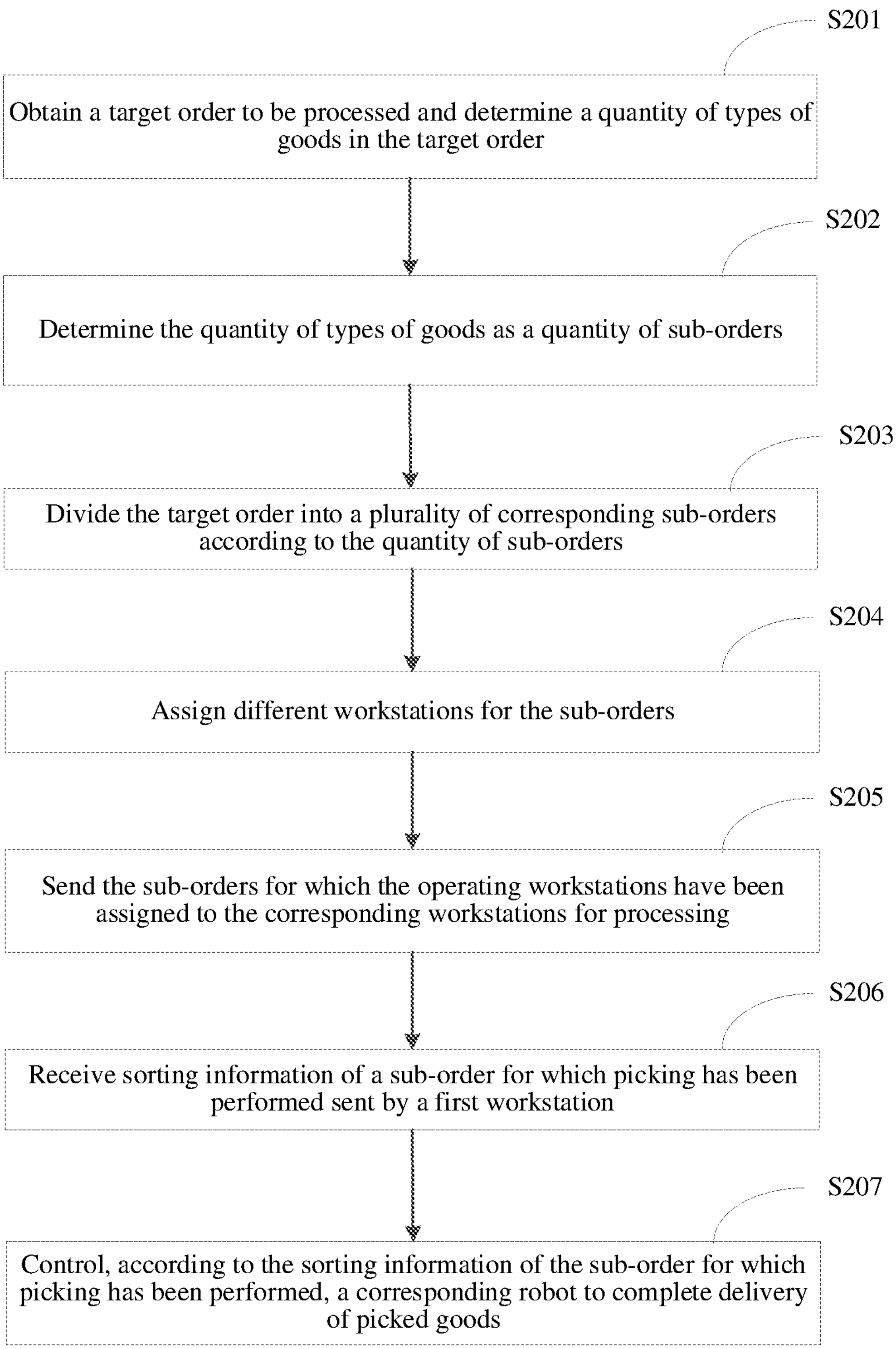

Determine, according to picking completed information, a mark of a sub-order for which picking has been performed

S402

Determine, according to the mark of the sub-order for which picking has been performed, whether there is a sub-order for which picking has not been performed in a target order No →

S407

Determine, according to the mark of the sub-order for which picking has been performed, a grid corresponding to the sub-order for which picking has been performed Yes ↓ S403

There are a plurality of sub-orders for which picking has not been performed; and determine predicted periods of picking corresponding to goods in the plurality of sub-orders for which picking has not been performed

S404

Determine a minimum predicted period of picking among the predicted periods of picking

S408

Generate a corresponding delivery instruction according to the grid

S405

Compare the minimum predicted period of picking and a preset picking period threshold, to determine whether the comparison result is the minimum predicted period of picking is less than the preset picking period threshold No

S409

Send the delivery instruction to a robot, so that the robot transports goods to the grid Yes ↓ S406

Determine a second workstation of an order for which picking has not been performed corresponding to the minimum predicted period of picking as the second workstation to be moved to and corresponding to the sub-order for which picking has not been performed

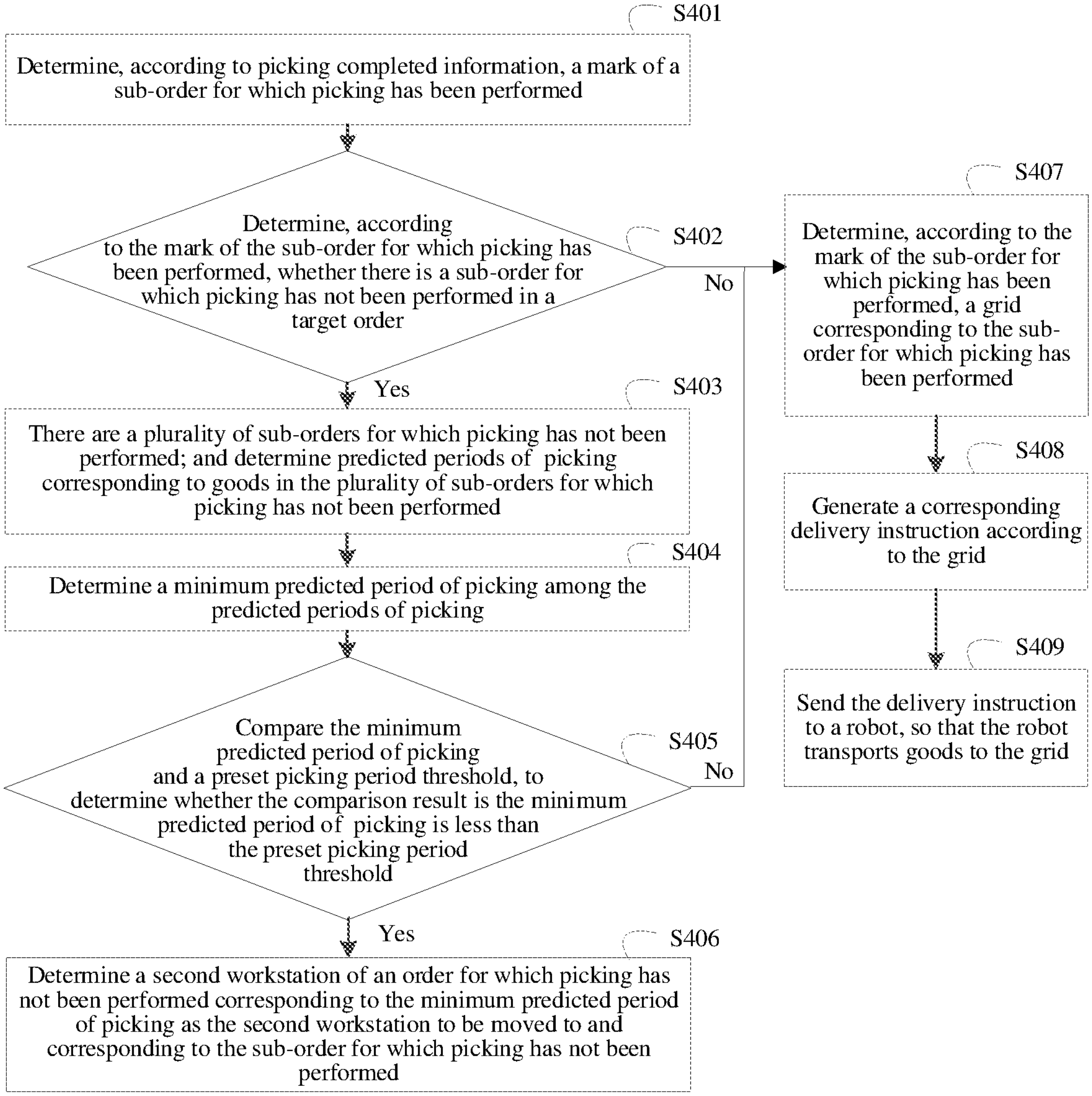

Order processing apparatus

501

Obtaining module

502

Determining module

503

Assignment module

504

Sending module

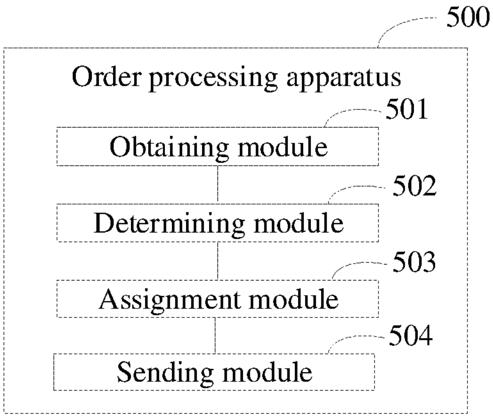

FIG. 7

ORDER PROCESSING METHOD, APPARATUS, DEVICE, SYSTEM, MEDIUM, AND PRODUCT

CROSS-REFERENCE TO RELATED APPLICATIONS

This application is a continuation of International Patent Application No. PCT/CN2022/079428 filed on Mar. 4, 2022 which claims priority to Chinese Patent Application No. CN 202110350668.9, filed with the China National Intellectual Property Administration on Mar. 31, 2021 and entitled "ORDER PROCESSING METHOD, APPARATUS, DEVICE, SYSTEM, MEDIUM, AND PRODUCT", which are incorporated herein by references in their entireties.

TECHNICAL FIELD

Embodiments of the present disclosure relate to the field of intelligent warehousing technologies, and in particular, to an order processing method, apparatus, device, system, medium, and product.

BACKGROUND

Accompanied with the continuous development of intelligent warehousing technologies, the social demand for storage is also increasing. Workstations and robots can assist in the handling of various types of goods, thereby improving the goods processing efficiency.

In a current intelligent warehousing system, all orders issued by a customer system are assigned to different workstations according to the orders, and at the same time, delivery tasks are generated for robots. The robots are arranged in a workstation region in an idle state and wait for a picking individual to place picked goods on trays of the robots. When a robot receives a delivery task, the robot transports the goods to a corresponding grid to complete the delivery task.

Usually, the quantity of grids is limited, there are a plurality of types of goods in an order, and a picking individual on a same workstation is responsible for picking all goods in the same order; therefore the total period of picking for one order is long, resulting in the influence on the time of delivery order and the occupancy time of the corresponding grid. When the quantity of occupied grids reaches the upper limit, the delivery corresponding to a subsequent order can be performed only when a grid becomes available after a previous order is completed to release the grid, resulting in that the overall delivery efficiency is low.

SUMMARY

The present disclosure provides an order processing method, apparatus, device, system, medium, and product, so as to solve the current problem of the low overall delivery efficiency.

A first aspect of embodiments of the present disclosure provides an order processing method, including:

obtaining a target order to be processed and determining a quantity of types of goods in the target order;

dividing the target order into a plurality of sub-orders according to the quantity of types of goods and assigning different workstations for the sub-orders; and sending the sub-orders for which the workstations have been assigned to the corresponding workstations for processing.

Optionally, in the method as stated above, the dividing the target order into a plurality of sub-orders according to the quantity of types of goods includes: determining the quantity of types of goods as a quantity of sub-orders; and dividing the target order into the plurality of corresponding sub-orders according to the quantity of sub-orders.

Optionally, in the method as stated above, after the sending the sub-orders for which the workstations have been assigned to the corresponding workstations for processing, the method further includes: receiving sorting information of a sub-order for which picking has been performed sent by a first workstation, where the sorting information of the sub-order for which picking has been performed is sent with respect to that goods corresponding to the sub-order for which picking has been performed have been picked in a first box; and the first workstation is a workstation corresponding to the sub-order for which picking has been performed and the first box is a box for storing the goods corresponding to the sub-order for which picking has been performed; and controlling, according to the sorting information of the sub-order for which picking has been performed, a corresponding robot to complete delivery of picked goods.

Optionally, in the method as stated above, the sorting information of the sub-order for which picking has been performed includes picking completed information of the goods corresponding to the sub-order for which picking has been performed; and the controlling, according to the sorting information of the sub-order for which picking has been performed, a corresponding robot to complete delivery of picked goods includes: determining, according to the picking completed information, a mark of the sub-order for which picking has been performed; determining, according to the mark of the sub-order for which picking has been performed, whether there is a sub-order for which picking has not been performed in the target order; and if it is determined that there is no sub-order for which picking has not been performed, controlling the robot to complete the delivery of the picked goods.

Optionally, in the method as stated above, the controlling the robot to complete the delivery of the picked goods includes: determining, according to the mark of the sub-order for which picking has been performed, a grid corresponding to the sub-order for which picking has been performed; generating a corresponding delivery instruction according to the grid; and sending the delivery instruction to the robot, so that the robot transports the goods to the grid.

Optionally, in the method as stated above, if it is determined that there is a sub-order for which picking has not been performed, the method further includes: determining a second workstation to which the robot needs to move and corresponding to the sub-order for which picking has not been performed, where the second workstation is a workstation corresponding to the sub-order for which picking has not been performed; and controlling the robot to move to a waiting region of the corresponding second workstation.

Optionally, in the method as stated above, there are a plurality of sub-orders for which picking has not been performed; and the determining a second workstation to which the robot needs to move and corresponding to the sub-order for which picking has not been performed includes: determining predicted periods of picking corresponding to goods in the plurality of sub-orders for which picking has not been performed; and determining, according to the predicted periods of picking, second workstations to which the robot needs to move and corresponding to the sub-orders for which picking has not been performed.

Optionally, in the method as stated above, after the controlling the robot to move to a waiting region of the corresponding second workstation, the method further includes: after receiving sorting information corresponding to the sub-orders for which picking has not been performed sent by the second workstations, controlling the robot to move from the waiting regions of the second workstations to goods receiving regions, where the sorting information of the sub-orders for which picking has not been performed is sent when goods corresponding to the sub-orders for which picking has not been performed are being picked.

Optionally, in the method as stated above, the determining, according to the predicted periods of picking, second workstations to which the robot needs to move and corresponding to the sub-orders for which picking has not been performed includes: determining a minimum predicted period of picking among the predicted periods of picking; and determining a second workstation of a sub-order for which picking has not been performed corresponding to the minimum predicted period of picking as the second workstation to be moved to and corresponding to the sub-order for which picking has not been performed.

Optionally, in the method as stated above, the determining a second workstation of a sub-order for which picking has not been performed corresponding to the minimum predicted period of picking as the second workstation to be moved to and corresponding to the sub-order for which picking has not been performed includes: comparing the minimum predicted period of picking and a preset picking period threshold; and if it is determined that the minimum predicted period of picking is less than the preset picking period threshold, determining the second workstation of the sub-order for which picking has not been performed corresponding to the minimum predicted period of picking as the second workstation to be moved to and corresponding to the sub-order for which picking has not been performed.

Optionally, in the method as stated above, after the comparing the minimum predicted period of picking and a preset picking period threshold, the method further includes: if it is determined that the minimum predicted period of picking is greater than or equal to the preset picking period threshold, performing the step of determining, according to the mark of the sub-order for which picking has been performed, a grid corresponding to the sub-order for which picking has been performed.

Optionally, in the method as stated above, the determining predicted periods of picking corresponding to goods in the plurality of sub-orders for which picking has not been performed includes: determining, according to marks of the sub-orders for which picking has not been performed, marks of second boxes corresponding to the sub-orders for which picking has not been performed, where the second boxes are boxes of the goods corresponding to the sub-orders for which picking has not been performed; obtaining current positions of the second boxes on a conveyor line according to the marks of the second boxes; and determining, according to the current positions, predicted periods of picking.

Optionally, in the method as stated above, the determining, according to the current positions, predicted periods of picking includes: determining a to-be-picked sequence of the second boxes on the conveyor line according to the current positions; and determining, according to the to-be-picked sequence and a preset box-related average period of picking, the predicted periods of picking.

Optionally, in the method as stated above, the box-related average period of picking is an average period of picking of each piece of goods; and the determining, according to the to-be-picked sequence and a preset box-related average period of picking, the predicted periods of picking includes: determining a mark of each box excluding the sub-orders in front of the second boxes in the to-be-picked sequence according to the to-be-picked sequence; determining a quantity of goods to be picked in all the boxes excluding the sub-orders according to the marks of the boxes excluding the sub-orders; and determining a predicted period of waiting according to the quantity of goods to be picked in all the boxes excluding the sub-orders and the average period of picking of each piece of goods.

Optionally, in the method as stated above, before the determining, according to the quantity of goods to be picked in all the boxes excluding the sub-orders and the average period of picking of each piece of goods, the predicted periods of picking, the method further includes: determining an arrangement sequence of the sub-orders corresponding to the goods to be picked in the second boxes; determining a to-be-picked sequence of goods to be picked corresponding to the sub-orders for which picking has not been performed in the second boxes according to the arrangement sequence of the sub-orders; determining, according to the to-be-picked sequence of the goods to be picked corresponding to the sub-orders for which picking has not been performed, an extra quantity of picking times corresponding to goods to be picked that do not pertain to the sub-orders; and the determining, according to the quantity of goods to be picked in all the boxes excluding the sub-orders and the average period of picking of each piece of goods, the predicted periods of picking includes: determining, according to the extra quantity of picking times, the quantity of goods to be picked in the boxes excluding the sub-orders, and the average period of picking of each piece of goods, the predicted period of picking.

A second aspect of the embodiments of the present disclosure provides an order processing apparatus, including:

- an obtaining module, configured to obtain a target order to be processed;
- a determining module, configured to determine a quantity of types of goods in the target order;
- an assignment module, configured to divide the target order into a plurality of sub-orders according to the quantity of types of goods and assign different workstations for the sub-orders; and
- a sending module, configured to send the sub-orders for which the workstations have been assigned to the corresponding workstations for processing.

Optionally, in the apparatus as stated above, when the assignment module divides the target order into a plurality of sub-orders according to the quantity of types of goods, the assignment module is configured to: determine the quantity of types of goods as a quantity of sub-orders; and divide the target order into the plurality of corresponding sub-orders according to the quantity of sub-orders.

Optionally, in the apparatus as stated above, the order processing apparatus further includes: a delivery module, configured to receive sorting information of a sub-order for which picking has been performed sent by a first workstation, where the sorting information of the sub-order for which picking has been performed is sent with respect to that goods corresponding to the sub-order for which picking has been performed have been picked in a first box; and the first workstation is a workstation corresponding to the sub-order for which picking has been performed and the first box is a box for storing the goods corresponding to the sub-order for which picking has been performed; and control, according to the sorting information of the sub-order for which picking has been performed, a corresponding robot to complete delivery of picked goods.

Optionally, in the apparatus as stated above, the sorting information of the sub-order for which picking has been performed includes picking completed information of the goods corresponding to the sub-order for which picking has been performed; and when the delivery module controls, according to the sorting information of the sub-order for which picking has been performed, a corresponding robot to complete delivery of picked goods, the delivery module is configured to: determine, according to the picking completed information, a mark of the sub-order for which picking has been performed; determine, according to the mark of the sub-order for which picking has been performed, whether there is a sub-order for which picking has not been performed in the target order; and if it is determined that there is no sub-order for which picking has not been performed, control the robot to complete the delivery of the picked goods.

Optionally, in the apparatus as stated above, when the delivery module controls a robot to complete delivery of picked goods, the delivery module is specifically configured to: determine, according to the mark of the sub-order for which picking has been performed, a grid corresponding to the sub-order for which picking has been performed; generate a corresponding delivery instruction according to the grid; and send the delivery instruction to the robot, so that the robot transports the goods to the grid.

Optionally, in the apparatus as stated above, if it is determined that there is a sub-order for which picking has not been performed, the delivery module is further configured to: determine a second workstation to which the robot needs to move and corresponding to the sub-order for which picking has not been performed, where the second workstation is a workstation corresponding to the sub-order for which picking has not been performed; and control the robot to move to a waiting region of the corresponding second workstation.

Optionally, in the apparatus as stated above, there are a plurality of sub-orders for which picking has not been performed; and when the delivery module determines a second workstation to which the robot needs to move and corresponding to the sub-order for which picking has not been performed, the delivery module is specifically configured to: determine predicted periods of picking corresponding to goods in the plurality of sub-orders for which picking has not been performed; and determine, according to the predicted periods of picking, second workstations to which the robot needs to move and corresponding to the sub-orders for which picking has not been performed.

Optionally, in the apparatus as stated above, the delivery module is further configured to: after receiving sorting information corresponding to the sub-orders for which picking has not been performed sent by the second workstations, control the robot to move from the waiting regions of the second workstations to goods receiving regions, where the sorting information of the sub-orders for which picking has not been performed is sent when goods corresponding to the sub-orders for which picking has not been performed are being picked.

Optionally, in the apparatus as stated above, when the delivery module determines, according to the predicted periods of picking, second workstations to which the robot needs to move and corresponding to the sub-orders for which picking has not been performed, the delivery module is specifically configured to: determine a minimum predicted period of picking among the predicted periods of picking; and determine a second workstation of a sub-order for which picking has not been performed corresponding to the minimum predicted period of picking as the second workstation to be moved to and corresponding to the sub-order for which picking has not been performed.

Optionally, in the apparatus as stated above, when the delivery module determines a second workstation of a sub-order for which picking has not been performed corresponding to the minimum predicted period of picking as the second workstation to be moved to and corresponding to the sub-order for which picking has not been performed, the delivery module is specifically configured to: compare the minimum predicted period of picking and a preset picking period threshold; and if it is determined that the minimum predicted period of picking is less than the preset picking period threshold, determine the second workstation of the sub-order for which picking has not been performed corresponding to the minimum predicted period of picking as the second workstation to be moved to and corresponding to the sub-order for which picking has not been performed.

Optionally, in the apparatus as stated above, the delivery module is further configured to: if it is determined that the minimum predicted period of picking is greater than or equal to the preset picking period threshold, perform the step of determining, according to the mark of the sub-order for which picking has been performed, a grid corresponding to the sub-order for which picking has been performed.

Optionally, in the apparatus as stated above, when the delivery module determines predicted periods of picking corresponding to goods in the plurality of sub-orders for which picking has not been performed, the delivery module is specifically configured to: determine, according to marks of the sub-orders for which picking has not been performed, marks of second boxes corresponding to the sub-orders for which picking has not been performed, where the second boxes are boxes of the goods corresponding to the sub-orders for which picking has not been performed; obtain current positions of the second boxes on a conveyor line according to the marks of the second boxes; and determine, according to the current positions, predicted periods of picking.

Optionally, in the apparatus as stated above, when the delivery module determines, according to the current positions, predicted periods of picking, the delivery module is specifically configured to: determine a to-be-picked sequence of the second boxes on the conveyor line according to the current positions; and determine, according to the to-be-picked sequence and a preset box-related average period of picking, the predicted periods of picking.

Optionally, in the apparatus as stated above, the box-related average period of picking is an average period of picking of each piece of goods; and when the delivery module determines, according to the to-be-picked sequence and a preset box-related average period of picking, the predicted periods of picking, the delivery module is specifically configured to: determine a mark of each box excluding the sub-orders in front of the second boxes in the to-be-picked sequence according to the to-be-picked sequence; determine a quantity of goods to be picked in all the boxes excluding the sub-orders according to the marks of the boxes excluding the sub-orders; and determine a predicted period of waiting according to the quantity of goods to be picked in all the boxes excluding the sub-orders and the average period of picking of each piece of goods.

Optionally, in the apparatus as stated above, the delivery module is further configured to: determine an arrangement sequence of the sub-orders corresponding to the goods to be picked in the second boxes; determine a to-be-picked sequence of goods to be picked corresponding to the sub-orders for which picking has not been performed in the second boxes according to the arrangement sequence of the sub-orders; determine, according to the to-be-picked sequence of the goods to be picked corresponding to the sub-orders for which picking has not been performed, an extra quantity of picking times corresponding to goods to be picked that do not pertain to the sub-orders; and when the delivery module determines, according to the quantity of goods to be picked in all the boxes excluding the sub-orders and the average period of picking of each piece of goods, the predicted periods of picking, the delivery module is specifically configured to: determine, according to the extra quantity of picking times, the quantity of goods to be picked in the boxes excluding the sub-orders, and the average period of picking of each piece of goods, the predicted period of picking.

A third aspect of the embodiments of the present disclosure provides a control device, including: a memory and a processor, where

- the memory is a memory configured to store instructions executable by the processor; and
- the processor is configured such that the processor performs the order processing method according to any one of the first aspect.

A fourth aspect of the embodiments of the present disclosure provides a warehousing system, including: the control device of the third aspect, a workstation, and a robot, where

- the workstation is configured to: when receiving a sorting completed instruction inputted by a picking individual, send sorting information of a sub-order for which picking has been performed to the control device according to the sorting completed instruction; and
- the robot is configured to perform corresponding operations under the control of the control device.

A fifth aspect of the embodiments of the present disclosure provides a computer-readable storage medium, where the computer-readable storage medium stores computer-executable instructions, and the computer-executable instructions, when executed by a processor, implement the order processing method according to any one of the first aspect.

A sixth aspect of the embodiments of the present disclosure provides a computer program product, including a computer program, where the computer program, when executed by a processor, implement the order processing method of any one of the first aspect.

According to the order processing method, apparatus, device, system, medium, and product provided in the embodiments of the present disclosure, the method includes: obtaining a target order to be processed and determining a quantity of types of goods in the target order; dividing the target order into a plurality of sub-orders according to the quantity of types of goods and assigning different workstations for the sub-orders; and sending the sub-orders for which the workstations have been assigned to the corresponding workstations for processing. In the order processing method of the embodiments of the present disclosure, the same order is divided into a plurality of sub-orders according to the quantity of types of goods and the sub-orders are assigned to different workstations for processing, so that the plurality of workstations process the same order at the same period of time, thereby improving the delivery efficiency of one order, reducing the grid occupancy time, and further improving the overall delivery efficiency.

BRIEF DESCRIPTION OF THE DRAWINGS

The accompanying drawings herein, which are incorporated into the specification and constitute a part of the specification, illustrate embodiments that conform to the present disclosure and are configured together with the specification to explain the principles of the present disclosure.

FIG. 3 is a schematic flowchart of an order processing method according to a second embodiment of the present disclosure;

FIG. 6 is a schematic flowchart of an order processing method according to a fourth embodiment of the present disclosure;

FIG. 7 is a schematic structural diagram of an order processing apparatus according to a fifth embodiment of the present disclosure;

Figure 1:
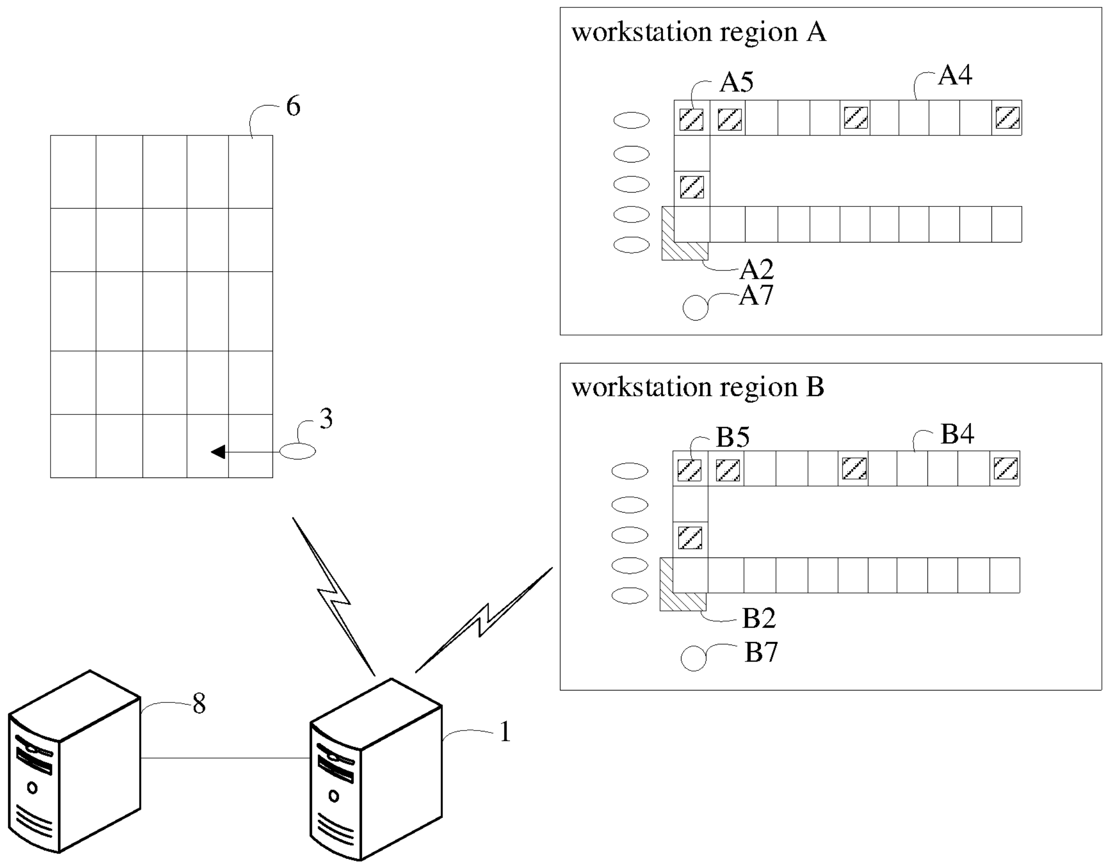
FIG. 1 is a scenario diagram of an order processing method according to an embodiment of the present disclosure.

Specific embodiments of the present disclosure are shown by the above drawings, and more detailed description will be given below. These drawings and text description are not for limiting the scope of the concept of the present disclosure in any way, but for illustrating the concept of the present disclosure for those skilled in the art by referring to specific embodiments.

DETAILED DESCRIPTION

Exemplary embodiments are described in detail herein, and examples of the exemplary embodiments are shown in the accompanying drawings. When the following description involves the accompanying drawings, unless otherwise indicated, the same numerals in different accompanying drawings represent the same or similar elements. The implementations described in the following exemplary embodiments do not represent all implementations consistent with the present disclosure. On the contrary, they are merely examples of apparatuses and methods consistent with some aspects of the present disclosure as detailed in the appended claims.

The following describes technical solutions of the present disclosure in detail with reference to specific embodiments. The following several specific embodiments may be combined with each other, and the same or similar concepts or processes may not be described repeatedly in some embodiments. The embodiments of the present disclosure are described below with reference to the accompanying drawings.

To clearly understand the technical solutions of this application, the prior art solution is first described in detail. A current intelligent warehousing system consists of a control device, a conveyor line, robots, and workstations. The robots include pickup robots and delivery robots. The control device obtains orders issued by a customer system in real time and assigns the orders to the respective workstations. In addition, the control system determines, according to the orders, boxes to be carried by the pickup robots, so as to control the pickup robots to take corresponding boxes from the warehouse to the conveyor line. When the boxes are transported to the workstations along with the conveyor line, picking individuals pick goods in the orders from the boxes and place the goods on the trays of the delivery robots. In this case, the picking individuals send picking completed information to the control device through the workstations, and after receiving the picking completed information, the control device controls the delivery robots which currently have the goods in the orders placed on the trays thereof to transport the goods to the corresponding grids of the orders to complete the delivery.

In the current intelligent warehousing system, an order issued by the customer system may include a variety of goods. For example, the order issued includes three different colors of pencils of the same model, and in this case, there are three types of goods in the order. Different types of goods are usually stored in different boxes. In the intelligent warehousing system, the goods can be stored according to SKUs (full name: Stock keeping Unit, Chinese: "库存保有单") for classified storage. In addition, an issued order may be assigned to one workstation and one corresponding grid. When picking needs to be performed for the order, the robots transport three boxes to the conveyor line, for a picking individual to pick goods therefrom one after another. After picking a pencil of one color, the picking individual may place the pencil of this color on the tray of a robot, so that the robot transports the pencil to the grid corresponding to the order. Since the order has three types of goods, the picking individual of the same workstation needs to pick three times in succession, and the three boxes may be separated by boxes required by other orders, so the overall period of picking of the order is long. As a result, the delivery efficiency of the order is low and the grid is occupied for a long time, thus leading to the low overall delivery efficiency.

For convenience of description, the two types of robots are collectively referred to as a robot in the following description. In addition, the embodiments of the present disclosure do not limit the type of the robot, as long as corresponding functions can be realized. Therefore, in view of the technical problem of the low overall delivery efficiency in the existing technology, it has been found, in the research, by the inventors that: in order to solve the problem of the low overall delivery efficiency of the current warehousing system, the same order may be assigned to be processed by a plurality of workstations on the basis of the existing technology, thereby improving the overall delivery efficiency. Specifically, first, a target order to be processed is obtained and a quantity of types of goods in the target order are determined. Since different types of goods are usually stored in different boxes, the target order may be divided into a plurality of sub-orders according to the quantity of types of goods, each sub-order being corresponding to one or more boxes, where a quantity of sub-orders is less than or equal to the quantity of types of goods. Finally, the sub-orders are assigned different workstations, for the workstations to process. In the order processing method of this embodiments of the present disclosure, the same order is processed by a plurality of workstations at the same period of time, so that the delivery efficiency of one order is improved, the grid occupancy time is reduced, and further the overall delivery efficiency is improved.

The technical solution of this application is proposed by the inventors based on the inventive discovery.

An application scenario of the order processing method provided in an embodiment of the present disclosure is described below. As shown in FIG. 1, the application scenario of this embodiment is illustrated by using two workstation regions, namely, a workstation region A and a workstation region B. 1 is a control device, A2 and B2 are workstations, 3 are robots, A4 and B4 are conveyor lines, A5 and B5 are boxes, 6 are grids, A7 and B7 are picking individuals, and 8 is a customer system. The network architecture of the application scenario corresponding to the order processing method provided in this embodiment of the present disclosure includes: the control device 1, the workstations A2 and B2, the robots 3, the conveyor lines A4 and B4, the boxes A5 and B5, the grids 6, and the customer system 8. There are a plurality of robots 3, which may be provided with trays for transporting goods and carry the goods to move. In the application scenario of this embodiment of the present disclosure, the target order has two types of clothes of the same model and with different colors, respectively red and blue. The control device 1 is in communication connection with the workstations A2 and B2, the robots 3, the conveyor lines A4 and B4, the grids 6, and the customer system 8. The control device 1 obtains, through the customer system 8, a target order to be processed and divides the target order into two sub-orders according to a quantity of types of goods, i.e., according to the red and blue colors of the clothes. Then, the red sub-order is assigned to the workstation A2 in the workstation region A, and the blue sub-order is assigned to the workstation B2 in the workstation region B, so that the workstation A2 and the workstation B2 perform subsequent processing. The subsequent processing may include the steps of: the picking individual A7 picks red clothes from the box A5 on the conveyor line A4 and loaded with the red clothes and places the picked red clothes on the robot 3, and then the control device 1 controls the robot 3 to transport the red clothes to the corresponding grid 6. Similarly, for the workstation region B, the picking individual B7 picks blue clothes from the box B5 on the conveyor line B4 and loaded with the blue clothes and places the picked blue clothes on the robot 3, and then the control device 1 controls the robot 3 to transport the blue clothes to the corresponding grid 6. After the goods of the red sub-order and blue sub-order are transported to the grid, delivery of all goods in the target order is completed. In the order processing method of this embodiment of the present disclosure, the same order is processed by a plurality of workstations at the same time period, for example, in this embodiment, the red clothes and the blue clothes in the target order are processed at the same period of time, so that the delivery efficiency of one order is improved, the grid occupancy time is reduced, and further the overall delivery efficiency is improved.

An embodiment of the present disclosure is described below with reference to the accompanying drawings of the description.

Figure 2:
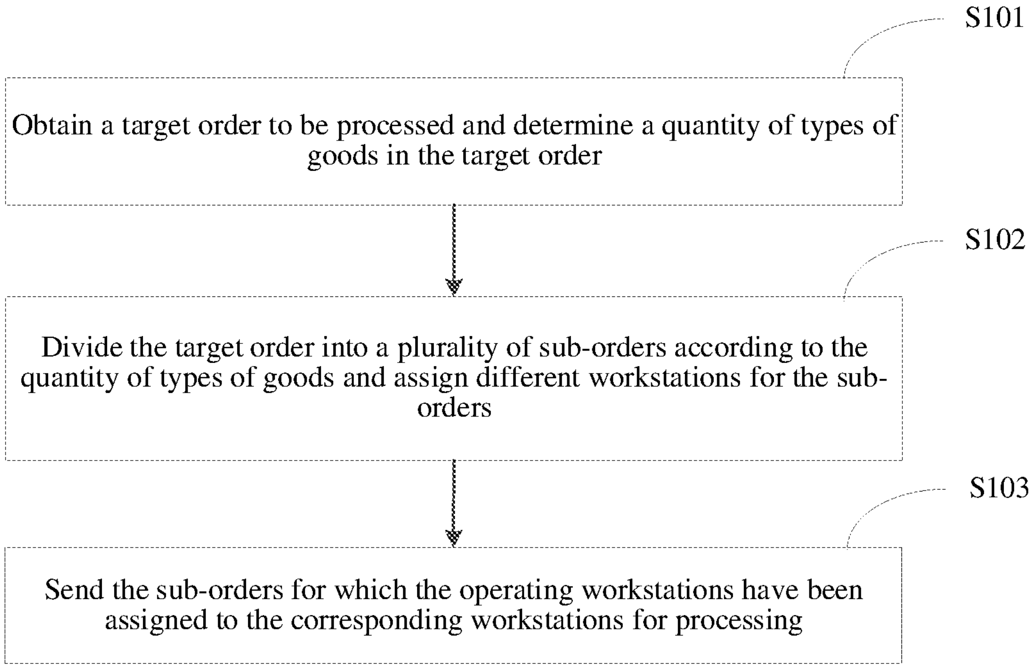
FIG. 2 is a schematic flowchart of an order processing method according to a first embodiment of the present disclosure.

FIG. 2 is a schematic flowchart of an order processing method according to a first embodiment of the present disclosure. As shown in FIG. 2, in this embodiment, an execution body of this embodiment of the present disclosure is an order processing apparatus, which may be integrated in electronic equipment, for example, a control device. The order processing method provided in this embodiment includes the following steps:

Step S101: Obtain a target order to be processed and determine a quantity of types of goods in the target order.

In this embodiment, the goods may be represented by using SKUs. The SKU is a measurement unit of inventory in and out, and may be extended to an abbreviation of a uniform number of product. Each type of goods corresponds to a unique SKU number. The type of goods may refer to an SKU type, and different SKUs correspond to different types.

The types of goods may be divided according to different standards. For example, a pen may be segmented according to its length, appearance model, color, and the like. Therefore, there may be a plurality of types of goods in the target order.

Obtaining of the target order may be performed through a customer system, or may be performed through another intermediate device, which is not limited in this embodiment.

Step S102: Divide the target order into a plurality of sub-orders according to the quantity of types of goods and assign different workstations for the sub-orders.

In this embodiment, the quantity of sub-orders is less than or equal to the quantity of types of goods in the target order, and when the target order is divided into the plurality of sub-orders according to the quantity of types of goods, a plurality of types of goods may be grouped into one sub-order, or each type of goods corresponds to one sub-order. For example, the types of goods in the target order are three types of pants of the same model and different colors. The pants of two colors may be grouped to one sub-order and the remainder may be formed as one sub-orders, or the pants of the three colors may be grouped into three sub-orders with each sub-order being corresponding to one color.

Grouping of a plurality of types of goods to one sub-order is more suitable for the scenario where a plurality of types of goods are stored in one box in a warehouse, and enabling each type of goods to correspond to one sub-order is more suitable for the scenario where each type of goods is stored in a different box separately. In addition, the quantity of sub-orders may also be determined according to the quantity of workstations. For example, there are a total of three workstations and the target order has four types of goods, the target order may be divided into three sub-orders according to the quantity of workstations, namely, three workstations. In addition, the method of dividing the target order into a plurality of sub-orders according to the quantity of types of goods may also be set according to actual requirements, which is not limited in this embodiment.

Step S103: Send the sub-orders for which the workstations have been assigned to the corresponding workstations for processing.

In this embodiment, after the sub-orders are assigned to the workstations, the subsequent process may be performed by the workstations, for example, notifying the picking individuals of what types of goods to be picked, the quantity of the goods, and the like.

According to an order processing method provided in this embodiment of the present disclosure, the method includes: obtaining a target order to be processed and determining a quantity of types of goods in the target order; dividing the target order into a plurality of sub-orders according to the quantity of types of goods and assigning different workstations for the sub-orders; and sending the sub-orders for which the workstations have been assigned to the corresponding workstations for processing. In the order processing method of this embodiment of the present disclosure, the same order is divided into a plurality of sub-orders according to the quantity of types of goods and the sub-orders are assigned to different workstations for processing, so that the plurality of workstations process the same order at the same period of time, thereby improving the delivery efficiency of one order, reducing the grid occupancy time, and further improving the overall delivery efficiency.

FIG. 3 is a schematic flowchart of an order processing method according to a second embodiment of the present disclosure. As shown in FIG. 3, the order processing method provided in this embodiment further describes the steps on the basis of the order processing method provided in the previous embodiment of the present disclosure. The order processing method provided in this embodiment includes the following steps.

Step S201: Obtain a target order to be processed and determine a quantity of types of goods in the target order.

In this embodiment, an implementation of step S201 is similar to that of step S101 in the previous embodiment of the present disclosure. Details are not described herein again.

Step S202: Determine the quantity of types of goods as a quantity of sub-orders.

In this embodiment, the quantity of types of goods is determined as the quantity of sub-orders, and therefore each type of goods in the target order corresponds to one sub-order. In the subsequent processing of the goods in the target order, each workstation only needs to process one type of goods in the target order, and the processing efficiency is high.

Step S203: Divide the target order into a plurality of corresponding sub-orders according to the quantity of sub-orders.

In this embodiment, there is a one-to-one correspondence between the sub-orders and the types of goods and each sub-order corresponds to one type of goods.

Step S204: Assign different workstations for the sub-orders.

In this embodiment, each sub-order is assigned to a different workstation, so that each workstation may process only one type of goods in the target order, thereby improving the delivery efficiency of the target order.

Step S205: Send the sub-orders for which the workstations have been assigned to the corresponding workstations for processing.

In this embodiment, an implementation of step S205 is similar to that of step S103 in the previous embodiment of the present disclosure. Details are not described herein again.

Step S206: Receive sorting information of a sub-order for which picking has been performed sent by a first workstation. The sorting information of the sub-order for which picking has been performed is sent with respect to that goods corresponding to the sub-order for which picking has been performed have been picked in a first box. The first workstation is a workstation corresponding to the sub-order for which picking has been performed and the first box is a box for storing the goods corresponding to the sub-order for which picking has been performed.

In this embodiment, when picking of goods of a particular sub-order in the target order is completed, the picking individual may send, through the workstation, the sorting information of the sub-order for which picking has been performed. The sorting information of the sub-order for which picking has been performed is used for indicating that the goods of the corresponding sub-order in the target order have been picked. The sub-order for which picking has been performed refers to a sub-order for which picking is currently completed by the picking individual of the first workstation.

Step S207: Control, according to the sorting information of the sub-order for which picking has been performed, a corresponding robot to complete delivery of picked goods.

In this embodiment, the corresponding sub-order and the grid information corresponding to the sub-order may be determined according to the sorting information of the sub-order for which picking has been performed. According to the sorting information of the sub-order for which picking has been performed, the corresponding robot may be controlled to transport the picked goods to the corresponding grid, to complete the delivery of the goods of the sub-order.

In the order processing method of this embodiment of the present disclosure, the same order is divided into a plurality of corresponding sub-orders according to the quantity of types of goods, each sub-order has only one type of goods in the target order. Therefore, after the sub-orders are assigned to different workstations for processing, the plurality of workstations are used and each workstation is only responsible for processing of one type of goods in the target order, so that the delivery efficiency of one order is further improved and in addition the overall delivery efficiency also improved.

Figure 4:
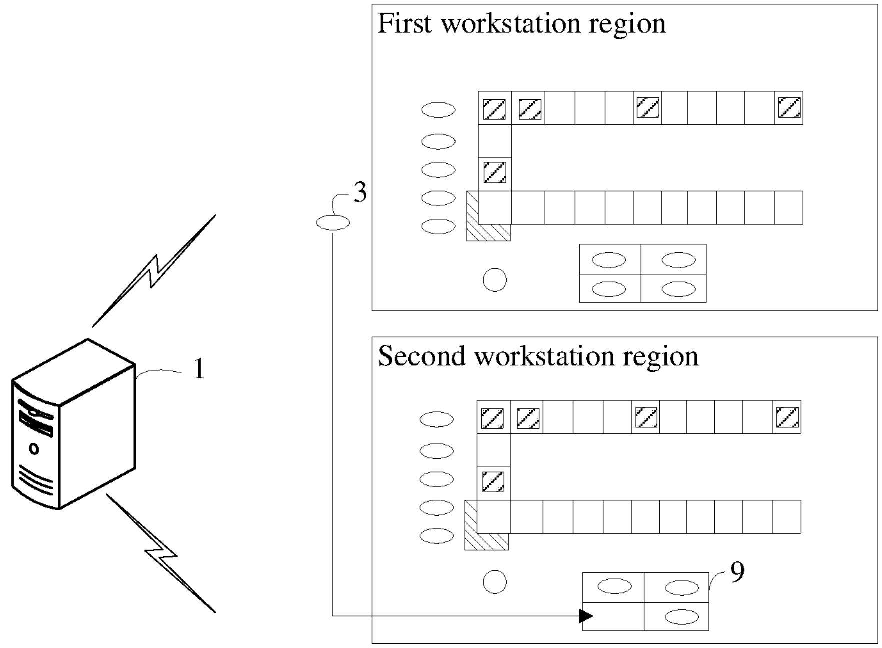
FIG. 4 is a scenario diagram corresponding to an order processing method according to a third embodiment of the present disclosure.
Figure 5:
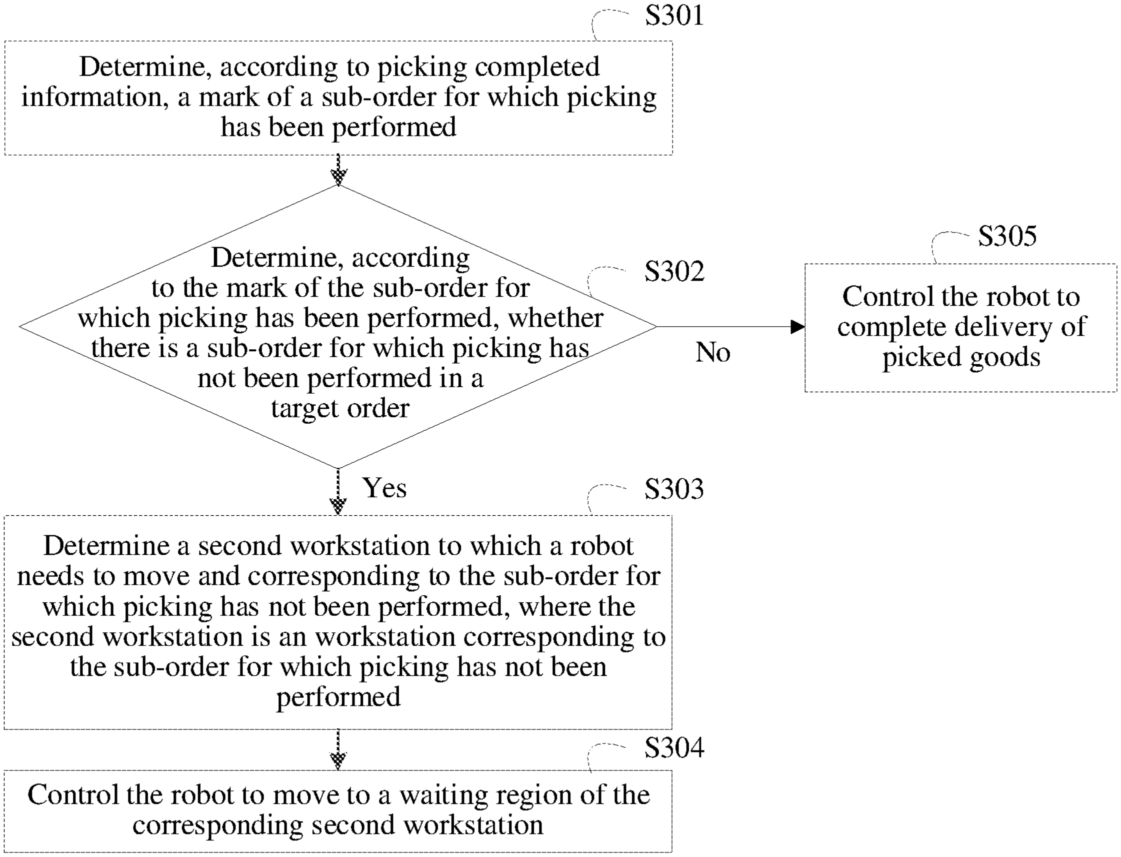
FIG. 5 is a schematic flowchart of the order processing method according to the third embodiment of the present disclosure.

FIG. 4 is a scenario diagram corresponding to an order processing method according to a third embodiment of the present disclosure and FIG. 5 is a schematic flowchart of the order processing method according to the third embodiment of the present disclosure. As shown in FIG. 5, in the order processing method provided in this embodiment, relevant solutions of determining a waiting region of a second workstation to which the robot moves are added on the basis of the order processing method provided in the previous embodiment of the present disclosure. The order processing method provided in this embodiment includes the following steps.

It should be noted that, the sorting information of the sub-order for which picking has been performed includes picking completed information of the goods corresponding to the sub-order for which picking has been performed.

Step S301: Determine, according to the picking completed information, a mark of the sub-order for which picking has been performed.

In this embodiment, the picking completed information refers to information about that picking of goods corresponding to the sub-order has been completed. The mark of the sub-order for which picking has been performed refers to a sub-order mark corresponding to the goods currently picked at the first workstation.

Step S302: Determine, according to the mark of the sub-order for which picking has been performed, whether there is a sub-order for which picking has not been performed in the target order. If there is a sub-order for which picking has not been performed in the target order, step S303 is performed; and if there is no sub-order for which picking has not been performed in the target order, step S305 is performed.

In this embodiment, the sub-order for which picking has not been performed refers to a sub-order for which the goods in the sub-order are not picked by the picking individual. Since there is an association relationship between each sub-order and the target order and in addition, whether the goods of each sub-order are picked is also recorded in the control device in real time, whether there is a sub-order for which picking has not been performed in the target order may be determined according to the mark of the sub-order for which picking has been performed.

If there is no sub-order for which picking has not been performed, it indicates that the current sub-order for which picking has been performed is the last sub-order for which picking is performed in the target order. If there is a sub-order for which picking has not been performed, it indicates that the current sub-order for which picking has been performed is not the last sub-order for which picking is performed in the target order and there is still a sub-order for which picking needs to be performed subsequently.

Step S303: Determine a second workstation to which the robot needs to move and corresponding to the sub-order for which picking has not been performed, where the second workstation is a workstation corresponding to the sub-order for which picking has not been performed.

In this embodiment, when there is one sub-order for which picking has not been performed, the corresponding second workstation may be directly determined according to the sub-order for which picking has not been performed. When there are a plurality of sub-orders for which picking has not been performed, the second workstation to which the robot needs to move may be determined according to a preset movement strategy. The preset movement strategy may be: the workstation closest to the first workstation among the workstations corresponding to the sub-orders for which picking has not been performed is the second workstation, a random workstation is the second workstation, or the workstation corresponding to a sub-order for which picking has not been performed with the shortest predicted period of picking among the sub-orders for which picking has not been performed is determined as the second workstation, and so on, which is not limited in this embodiment.

Step S304: Control the robot to move to a waiting region of the corresponding second workstation.

In this embodiment, as shown in FIG. 4, each workstation has a corresponding waiting region. In the figure, the control device 1 controls the robot 3 to move from the first workstation region to the waiting region 9 of the second workstation, and in addition, the robot 3 is in a state of leaving the first workstation region for a second workstation region.

Step S305: Control the robot to complete delivery of picked goods.

In this embodiment, if there is no sub-order for which picking has not been performed, it indicates that the current sub-order for which picking has been performed is the last sub-order for which picking is performed in the target order, and in this case, the robot may be controlled to complete the delivery of the picked goods, so as to complete the delivery of the target order.

Optionally, in this embodiment, the controlling the robot to complete the delivery of the picked goods includes:

- determining, according to the mark of the sub-order for which picking has been performed, a grid corresponding to the sub-order for which picking has been performed;
- in addition, generating a corresponding delivery instruction according to the grid; and sending the delivery instruction to the robot, so that the robot transports the goods to the grid.

In this embodiment, the grid corresponding to the sub-order for which picking has been performed may be determined according to the mark of the sub-order for which picking has been performed, and the grid corresponding to the sub-order for which picking has been performed is the same as the grid corresponding to the target order. In addition, after sending the delivery instruction to the robot, the robot may automatically select the optimal route to transport the goods to the grid according to the position of the grid.

Optionally, in this embodiment, there are a plurality of sub-orders for which picking has not been performed. The determining a second workstation to which the robot needs to move and corresponding to the sub-order for which picking has not been performed includes:

determining predicted periods of picking corresponding to goods in the plurality of sub-orders for which picking has not been performed; and determining, according to the predicted periods of picking, second workstations to which the robot needs to move and corresponding to the sub-orders for which picking has not been performed.

In this embodiment, when there are a plurality of sub-orders for which picking has not been performed, it is necessary to determine a second workstation to which the robot needs to move and corresponding to the sub-order for which picking has not been performed. In this case, the predicted periods of picking corresponding to the goods in the plurality of sub-orders for which picking has not been performed may be determined, so as to determine a more suitable second workstation based on the predicted periods of picking.

The predicted periods of picking refer to differences between reference time points at which the picking individuals pick the goods corresponding to the sub-order for which picking has not been performed and the current time point, and the predicted periods of picking may be determined according to an average period of picking obtained through big data statistics and current positions of the goods in the sub-orders for which picking has not been performed.

Optionally, in this embodiment, after the controlling the robot to move to a waiting region of the corresponding second workstation, the method further includes:

after receiving sorting information corresponding to the sub-orders for which picking has not been performed sent by the second workstations, controlling the robot to move from the waiting regions of the second workstations to goods receiving regions, where the sorting information of the sub-orders for which picking has not been performed is sent when goods corresponding to the sub-orders for which picking has not been performed are being picked.

In this embodiment, after a predicted period of picking, the picking individual may have picked the corresponding goods, and in this case, by controlling the robot to move from the waiting region of the second workstation to the goods receiving region thereof, the picking individual may be enabled to move by a small distance, thereby saving the time for the picking individual to place the picked goods on the tray of the robot and further improving the delivery efficiency of one order.

Optionally, in this embodiment, the determining, according to the predicted periods of picking, second workstations to which the robot needs to move and corresponding to the sub-orders for which picking has not been performed includes:

determining a minimum predicted period of picking among the predicted periods of picking; and determining a second workstation of a sub-order for which picking has not been performed corresponding to the minimum predicted period of picking as the second workstation to be moved to and corresponding to the sub-order for which picking has not been performed.

In this embodiment, the minimum predicted period of picking is used as a basis for determining the second workstation, so that the robot can get the goods corresponding to the sub-order after it moves to the corresponding second workstation and waits for a short time, and that the time from when the robot gets the goods corresponding to the current sub-order for which picking has been performed to when the robot gets the goods of all other sub-orders for which picking has not been performed is shortened, thereby shortening the delivery time of the target order and improving the delivery efficiency of the target order.

In the order processing method provided in this embodiment of the present disclosure, all goods of the target order are transported by one robot. When there is one sub-order for which picking has not been performed, the robot is controlled to move to the waiting region of the second workstation corresponding to the sub-order for which picking has not been performed. When there are a plurality of sub-orders for which picking has not been performed, the minimum predicted period of picking is determined among the predicted periods of picking, to determine, based on the minimum predicted period of picking, the waiting region of the second workstation to which the robot needs to move. The robot is then controlled to move to the waiting region of the second workstation. When the picking individual of the second workstation completes picking of the goods of the corresponding sub-order for which picking has not been performed, the robot is controlled to move from the waiting region to the goods receiving region thereof, so that the picking individual can place the picked goods on the tray of the robot. In addition, the picking completed information sent by the picking individual through the second workstation is received. In this case, the workstation where the robot is located is changed to the first workstation, a waiting region of a next second workstation to which the robot needs to move is determined based on the workstation where the robot is currently located and according to the picking completed information, and the process is cyclically performed, until the robot gets the goods of all the sub-orders for which picking has not been performed. In this case, the robot is controlled to transport all the goods to the corresponding grid, to complete the delivery of the target order. In the order processing method provided in this embodiment of the present disclosure, handling of the goods corresponding to all the sub-orders for which picking has not been performed in the target order is completed by one robot, so that the quantity of robots can be reduced and the costs can be reduced.

FIG. 6 is a schematic flowchart of an order processing method according to a fourth embodiment of the present disclosure. As shown in FIG. 6, in the order processing method provided in this embodiment, the step of determining whether the robot needs to move to the waiting region of the second workstation is added on the basis of the order processing method provided in the previous embodiment of the present disclosure. The order processing method provided in this embodiment includes the following steps.

Step S401: Determine, according to the picking completed information, a mark of the sub-order for which picking has been performed.

In this embodiment, an implementation of step S401 is similar to that of step S301 in the previous embodiment of the present disclosure. Details are not described herein again.

Step S402: Determine, according to the mark of the sub-order for which picking has been performed, whether there is a sub-order for which picking has not been performed in the target order. If there is a sub-order for which picking has not been performed in the target order, step 403 is performed; and if there is no sub-order for which picking has not been performed in the target order, step 407 is performed.

In this embodiment, an implementation of step 402 is similar to that of step 302 in the previous embodiment of the present disclosure. Details are not described herein again.

Step S403: There are a plurality of sub-orders for which picking has not been performed; and determine predicted periods of picking corresponding to goods in the plurality of sub-orders for which picking has not been performed.

In this embodiment, only when there are a plurality of sub-orders for which picking has not been performed, the predicted periods of picking corresponding to the goods in the plurality of sub-orders for which picking has not been performed need to be determined.

Optionally, in this embodiment, the determining predicted periods of picking corresponding to goods in the plurality of sub-orders for which picking has not been performed includes:

- determining, according to marks of the sub-orders for which picking has not been performed, marks of second boxes corresponding to the sub-orders for which picking has not been performed, where the second boxes are boxes of the goods corresponding to the sub-orders for which picking has not been performed;
- obtaining current positions of the second boxes on a conveyor line according to the marks of the second boxes; and
- determining, according to the current positions, predicted periods of picking.

In this embodiment, there is a correspondence between the marks of the sub-orders for which picking has not been performed and the marks of the second boxes. The marks of the second boxes may be box numbers, QR codes, and the like, which are not limited in this embodiment. When each box is transported to the conveyor line, the warehousing system records mark information of the box, and therefore the current positions of the second boxes on the conveyor line can be determined according to the marks of the second boxes.

In addition, a relative distance between the current position and the workstation may be calculated by using the workstation as the origin, so as to determine the predicted period of picking by using an average displacement speed of the box obtained through big data statistics, or how many boxes the second box is currently ranked behind may be determined by using the current position, so as to determine the predicted period of picking by using a box-related average period of picking obtained through big data statistics. In this case, the predicted period of waiting may be determined in other ways according to the current position, which is not limited in this embodiment.

Optionally, in this embodiment, the determining, according to the current position, the predicted period of picking includes:

- determining a to-be-picked sequence of the second boxes on the conveyor line according to the current positions; and
- determining, according to the to-be-picked sequence and a preset box-related average period of picking, the predicted periods of picking.

In this embodiment, the to-be-picked sequence refers to a rank for picking of the second box among all the boxes on the current conveyor line. For example, if a second box A is currently ranked eighth on the conveyor line and there are seven boxes in which picking has not been performed in front of the second box A, the to-be-picked sequence of the second box A is eighth.

In addition, the preset box-related average period of picking may be set by counting an average period of picking by a picking individual through big data statistics, or may be set according to actual requirements, which is not limited in this embodiment. The preset box-related average period of picking may refer to an average period of picking of each box, or an average period of picking of each piece of goods in each box, which is not limited in this embodiment. The predicted period of picking may be calculated by using the to-be-picked sequence and the preset box-related average period of picking. For example, if the to-be-picked sequence is eighth and the preset box-related average period of picking is the average period of picking of each box, namely, one minute, the predicted period of picking is eight minutes.

Optionally, in this embodiment, the box-related average period of picking is the average period of picking of each piece of goods.

The determining, according to the to-be-picked sequence and a preset box-related average period of picking, the predicted periods of picking includes:

- determining a mark of each box excluding the sub-orders in front of the second boxes in the to-be-picked sequence according to the to-be-picked sequence.
- determining a quantity of goods to be picked in all the boxes excluding the sub-orders according to the marks of the boxes excluding the sub-orders; and
- determining a predicted period of waiting according to the quantity of goods to be picked in all the boxes excluding the sub-orders and the average period of picking of each piece of goods.

In this embodiment, the boxes excluding the sub-orders refer to boxes that do not include goods of a sub-order for which picking has not been performed, and according to the mark information of the boxes excluding the sub-orders, the quantity of goods to be picked in all the boxes excluding the sub-orders can be determined, so that the predicted period of picking can be calculated by using the average period of picking of each piece of goods and the quantity of goods to be picked. For example, if the to-be-picked sequence is eighth, the average period of picking of each piece of goods is five seconds and the quantity of goods to be picked in the previous seven boxes excluding the sub-orders is 100, the predicted period of picking is 500 seconds. The predicted period of picking determined by using the average period of picking of each piece of goods is more accurate than that determined by using a box-related average period of picking.

Optionally, in this embodiment, before the determining, according to the quantity of goods to be picked in all the boxes excluding the sub-orders and the average period of picking of each piece of goods, the predicted periods of picking, the method further includes:

- determining an arrangement sequence of the sub-orders corresponding to the goods to be picked in the second boxes;
- determining a to-be-picked sequence of goods to be picked corresponding to the sub-orders for which picking has not been performed in the second boxes according to the arrangement sequence of the sub-orders;

determining, according to the to-be-picked sequence of the goods to be picked corresponding to the sub-orders for which picking has not been performed, an extra quantity of picking times corresponding to goods to be picked that do not pertain to the sub-orders; and the determining, according to the quantity of goods to be picked in all the boxes excluding the sub-orders and the average period of picking of each piece of goods, the predicted periods of picking includes:

determining, according to the extra quantity of picking times, the quantity of goods to be picked in the boxes excluding the sub-orders, and the average period of picking of each piece of goods, the predicted period of picking.

In this embodiment, since each box may contain goods of a plurality of orders, it is assumed that the second box contains goods of sub-orders corresponding to three orders, for example, goods of orders a, b, and c, respectively, and the target order is the order b, in this case, the goods to be picked that do not pertain to the sub-orders are the goods of the order a. When the picking individual picks the second box, the picking individual performs goods picking in a sequence of a-b-c, and in this case, the corresponding arrangement sequence is a-b-c and the target order is ranked second. To determine the predicted period of picking more accurately, the to-be-picked sequence of the sub-orders for which picking has not been performed corresponding to the target order may be determined according to the arrangement sequence. If it is assumed that the quantity of goods in the order a is five pieces, the extra quantity of picking times corresponding to the goods to be picked that do not pertain to the sub-orders is five pieces. A sum of the extra quantity of picking times and the quantity of goods to be picked in all the boxes excluding the orders is calculated, and then the predicted period of picking may be determined by using the average period of picking of each piece of goods and the sum.

Step S404: Determine a minimum predicted period of picking among the predicted periods of picking.

In this embodiment, the minimum predicted period of picking is the same as the minimum predicted period of the robot to move, at the current time, to the waiting region of the second workstation for waiting, and therefore the workstation corresponding to the minimum predicted period of picking is also the workstation, at the waiting region of which the robot waits for the shortest time.

Step S405: Compare the minimum predicted period of picking and a preset picking period threshold, to determine whether the comparison result is the minimum predicted period of picking is less than the preset picking period threshold. If there is a sub-order for which picking has not been performed in the target order, step S406 is performed; and if there is no sub-order for which picking has not been performed in the target order, step S407 is performed.

In this embodiment, comparing the minimum predicted period of picking and the preset picking period threshold is performed for providing a basis for subsequently determining of whether the robot moves to the second workstation. The preset picking period threshold may be set according to an actual requirement, which is not limited in this embodiment.

Step S406: Determine a second workstation of a sub-order for which picking has not been performed corresponding to the minimum predicted period of picking as the second workstation to be moved to and corresponding to the sub-order for which picking has not been performed.

In this embodiment, the minimum predicted period of picking which is less than the preset picking period threshold is used as a basis for determining the second workstation, so that the robot can get the goods corresponding to the sub-order after it moves to the corresponding second workstation and waits for a short time, so that the delivery time of the target order is shortened and the delivery efficiency of the target order is improved.

Step S407: Determine, according to the mark of the sub-order for which picking has been performed, a grid corresponding to the sub-order for which picking has been performed.

In this embodiment, the sub-order for which picking has been performed is part of the target order and shares one grid with the target order.

Step S408: Generate a corresponding delivery instruction according to the grid.

In this embodiment, each grid has corresponding position information, and the corresponding delivery instruction generated according to the grid also has the position information of the grid.

Step S409: Send the delivery instruction to the robot, so that the robot transports the goods to the grid.

In this embodiment, after receiving the delivery instruction, the robot may transport the goods to the region near the grid, and transfer the goods to the grid through the tray.

In the order processing method provided in this embodiment of the present disclosure, on the basis of the previous embodiment, a process of comparing the minimum predicted period of picking and the preset picking period threshold is added, so that the method of transporting, by one robot, all the goods corresponding to the sub-orders for which picking has not been performed in the previous embodiment is changed to the method of determining, according to a magnitude relationship between the minimum predicted period of picking and the preset picking period threshold, how many pieces of goods which correspond to sub-orders for which picking has not been performed and which the robot transports. When the minimum predicted period of picking is greater than or equal to the preset picking period threshold, the robot is controlled to deliver the goods corresponding to the sub-order for which picking has been performed, and when the minimum predicted period of picking is less than the preset picking period threshold, the robot is controlled to move to the waiting region of the second workstation corresponding to the minimum predicted period of picking, so that the robot transports the goods corresponding to the plurality of sub-orders. Therefore, the waiting time of the robot in the waiting region is reduced, the operation efficiency of one robot is improved, and the overall delivery efficiency is improved.

FIG. 7 is a schematic structural diagram of an order processing apparatus according to a fifth embodiment of the present disclosure. As shown in FIG. 7, in this embodiment, an order processing apparatus 500 includes:

an obtaining module 501, configured to obtain a target order to be processed;

a determining module 502, configured to determine a quantity of types of goods in the target order;

an assignment module 503, configured to divide the target order into a plurality of sub-orders according to the quantity of types of goods and assign different workstations for the sub-orders; and a sending module 504, configured to send the sub-orders for which the workstations have been assigned to the corresponding workstations for processing.

The order processing apparatus provided in this embodiment may be configured to execute the technical solution in the method embodiment shown in FIG. 2. The implementation principles and technical effects thereof are similar to those of the method embodiment shown in FIG. 2. Details are not described herein again.

Figure 8:
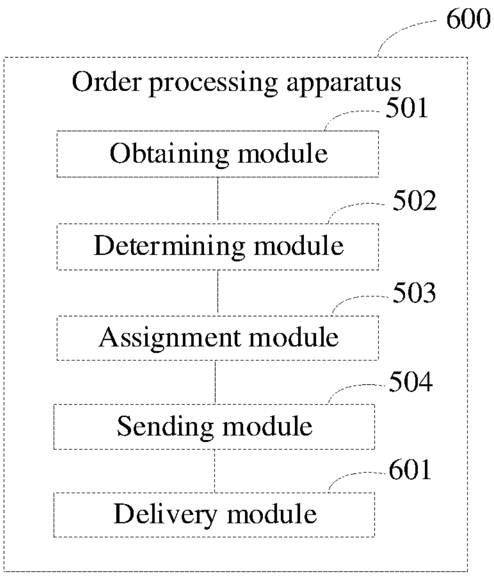
FIG. 8 is a schematic structural diagram of an order processing apparatus according to a sixth embodiment of the present disclosure.

In addition, FIG. 8 is a schematic structural diagram of the order processing apparatus provided in the sixth embodiment of the present disclosure. As shown in FIG. 8, in this embodiment, for the order processing apparatus of the present disclosure, on the basis of the order processing apparatus provided in the previous embodiment of the present disclosure, an order processing apparatus 600 is further refined.

Optionally, in this embodiment, when the assignment module 503 divides the target order into a plurality of sub-orders according to the quantity of types of goods, the assignment module 503 is configured to:

determine the quantity of types of goods as a quantity of sub-orders; and divide the target order into a plurality of corresponding sub-orders according to the quantity of sub-orders.

Optionally, in this embodiment, the order processing apparatus 600 further includes:

a delivery module 601, configured to receive sorting information of a sub-order for which picking has been performed sent by a first workstation, where the sorting information of the sub-order for which picking has been performed is sent with respect to that goods corresponding to the sub-order for which picking has been performed have been picked in a first box; and the first workstation is a workstation corresponding to the sub-order for which picking has been performed and the first box is a box for storing the goods corresponding to the sub-order for which picking has been performed; and control, according to the sorting information of the sub-order for which picking has been performed, a corresponding robot to complete delivery of picked goods.

Optionally, in this embodiment, the sorting information of the sub-order for which picking has been performed includes picking completed information of the goods corresponding to the sub-order for which picking has been performed.

when the delivery module 601 controls, according to the sorting information of the sub-order for which picking has been performed, a corresponding robot to complete delivery of picked goods, the delivery module 601 is configured to:

determine, according to the picking completed information, a mark of the sub-order for which picking has been performed; determine, according to the mark of the sub-order for which picking has been performed, whether there is a sub-order for which picking has not been performed in the target order; and if it is determined that there is no sub-order for which picking has not been performed, control the robot to complete the delivery of the picked goods.

Optionally, in this embodiment, when the delivery module 601 controls the robot to complete delivery of picked goods, the delivery module 601 is specifically configured to:

determine, according to the mark of the sub-order for which picking has been performed, a grid corresponding to the sub-order for which picking has been performed; generate a corresponding delivery instruction according to the grid; and send the delivery instruction to the robot, so that the robot transports the goods to the grid.

Optionally, in this embodiment, if it is determined that there is a sub-order for which picking has not been performed, the delivery module 601 is further configured to:

determine a second workstation to which the robot needs to move and corresponding to the sub-order for which picking has not been performed, where the second workstation is a workstation corresponding to the sub-order for which picking has not been performed; and control the robot to move to a waiting region of the corresponding second workstation.

Optionally, in this embodiment, there are a plurality of sub-orders for which picking has not been performed. When the delivery module 601 determines a second workstation to which the robot needs to move and corresponding to the sub-order for which picking has not been performed, the delivery module 601 is specifically configured to:

determine predicted periods of picking corresponding to goods in the plurality of sub-orders for which picking has not been performed. determine, according to the predicted periods of picking, second workstations to which the robot needs to move and corresponding to the sub-orders for which picking has not been performed.

Optionally, in this embodiment, the delivery module 601 is further configured to:

after receiving sorting information corresponding to the sub-orders for which picking has not been performed sent by the second workstations, control the robot to move from the waiting regions of the second workstations to goods receiving regions, where the sorting information of the sub-orders for which picking has not been performed is sent when goods corresponding to the sub-orders for which picking has not been performed are being picked.

Optionally, in this embodiment, when the delivery module 601 determines, according to the predicted periods of picking, second workstations to which the robot needs to move and corresponding to the sub-orders for which picking has not been performed, the delivery module 601 is specifically configured to:

determine a minimum predicted period of picking among the predicted periods of picking; and determine a second workstation of a sub-order for which picking has not been performed corresponding to the minimum predicted period of picking as the second workstation to be moved to and corresponding to the sub-order for which picking has not been performed.

Optionally, in this embodiment, when the delivery module 601 determines a second workstation of a sub-order for which picking has not been performed corresponding to the minimum predicted period of picking as the second workstation to be moved to and corresponding to the sub-order for which picking has not been performed, the delivery module 601 is specifically configured to:

compare the minimum predicted period of picking and a preset picking period threshold; and if it is determined that the minimum predicted period of picking is less than the preset picking period threshold, determine the second workstation of the sub-order for which picking has not been performed corresponding to the minimum predicted period of picking as the second workstation to be moved to and corresponding to the sub-order for which picking has not been performed.

Optionally, in this embodiment, the delivery module 601 is further configured to:

if it is determined that the minimum predicted period of picking is greater than or equal to the preset picking period threshold, perform the step of determining, according to the mark of the sub-order for which picking has been performed, a grid corresponding to the sub-order for which picking has been performed.

Optionally, in this embodiment, when the delivery module 601 determines predicted periods of picking corresponding to goods in the plurality of sub-orders for which picking has not been performed, the delivery module 601 is specifically configured to:

determine, according to marks of the sub-orders for which picking has not been performed, marks of second boxes corresponding to the sub-orders for which picking has not been performed, where the second boxes are boxes of the goods corresponding to the sub-orders for which picking has not been performed; obtain current positions of the second boxes on a conveyor line according to the marks of the second boxes; and determine, according to the current positions, predicted periods of picking.

Optionally, in this embodiment, when the delivery module 601 determines, according to the current positions, predicted periods of picking, the delivery module 601 is specifically configured to:

determine a to-be-picked sequence of the second boxes on the conveyor line according to the current positions; and determine, according to the to-be-picked sequence and a preset box-related average period of picking, the predicted periods of picking.

Optionally, in this embodiment, the box-related average period of picking is the average period of picking of each piece of goods.

When the delivery module 601 determines, according to the to-be-picked sequence and a preset box-related average period of picking, the predicted periods of picking, the delivery module 601 is specifically configured to:

determine a mark of each box excluding the sub-orders in front of the second boxes in the to-be-picked sequence according to the to-be-picked sequence; determine a quantity of goods to be picked in all the boxes excluding the sub-orders according to the marks of the boxes excluding the sub-orders; and determine a predicted period of waiting according to the quantity of goods to be picked in all the boxes excluding the sub-orders and the average period of picking of each piece of goods.

Optionally, in this embodiment, the delivery module 601 is further configured to:

determine an arrangement sequence of the sub-orders corresponding to the goods to be picked in the second boxes; determine a to-be-picked sequence of goods to be picked corresponding to the sub-orders for which picking has not been performed in the second boxes according to the arrangement sequence of the sub-orders; and determine, according to the to-be-picked sequence of the goods to be picked corresponding to the sub-orders for which picking has not been performed, an extra quantity of picking times corresponding to goods to be picked that do not pertain to the sub-orders.

When the delivery module 601 determines, according to the quantity of goods to be picked in all the boxes excluding the sub-orders and the average period of picking of each piece of goods, the predicted periods of picking, the delivery module 601 is specifically configured to:

determine, according to the extra quantity of picking times, the quantity of goods to be picked in the boxes excluding the sub-orders, and the average period of picking of each piece of goods, the predicted period of picking.

The order processing apparatus provided in this embodiment may be configured to execute the technical solution in the method embodiment shown in FIG. 2 to FIG. 6. The implementation principles and technical effects thereof are similar to those of the method embodiment shown in FIG. 2 to FIG. 6. Details are not described herein again.

According to the embodiments of the present disclosure, the present disclosure further provides a control device, a warehousing system, a computer-readable storage medium, and a computer program product.

Figure 9:
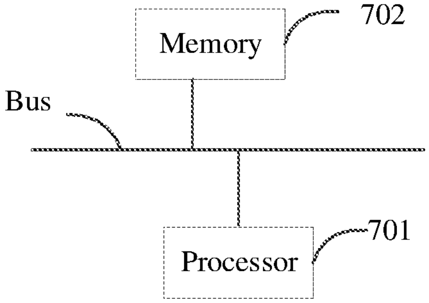
FIG. 9 is a schematic structural diagram of a control device according to a seventh embodiment of the present disclosure.

As shown in FIG. 9, FIG. 9 is a schematic structural diagram of a control device according to a seventh embodiment of the present disclosure. The control device is intended for various forms of digital computers, such as laptop computers, desktop computers, worktables, personal digital assistants, servers, blade-type servers, mainframe computers, and other suitable computers. The components illustrated herein, their connections and relationships, and their functions are by way of example only, and are not intended to limit the implementation of the present disclosure as described and/or required herein.

As shown in FIG. 9, the control device includes: a processor 701 and a memory 702. The components are connected to each other using different buses and can be installed on a common motherboard or in other ways as needed. The processor may process instructions for execution within the control device. The bus may be an industry standard architecture (Industry Standard Architecture, ISA for short) bus, a peripheral component interconnect (Peripheral Component Interconnect, PCI for short) bus, or an extended industry standard architecture (Extended Industry Standard Architecture, EISA for short) bus, and the like. The buses may be classified as an address bus, a data bus, a control bus, and the like. For ease of description, the buses in the drawings of the present disclosure are not limited to only one bus or one type of buses.

The memory 702 is a non-transitory computer-readable storage medium provided in the present disclosure. The memory stores instructions that can be executed by at least one processor to enable the at least one processor to perform the order processing method provided in the present disclosure. The non-transitory computer-readable storage medium of the present disclosure stores computer instructions, which are used for enabling a computer to perform the order processing method provided in the present disclosure.

The memory 702, serving as a non-transitory computer-readable storage medium, may be configured to store non-transitory software programs, non-transitory computer-executable programs and modules, such as program instructions/modules (for example, the obtaining module 501, the determining module 502, the assignment module 503, and the sending module 504 shown in FIG. 7) corresponding to the order processing method in the embodiments of the present disclosure. The processor 701 runs non-transitory software programs, instructions, and modules stored in the memory 702, to execute various functional applications and data processing of a server, that is, to implement the order processing method in the method embodiment.

This embodiment also provides a warehousing system, including the control device, the workstation and the robot in the first to fourth embodiments.

The workstation is configured to: when receiving a sorting completed instruction inputted by a picking individual, send sorting information of a target order to the control device according to the sorting completed instruction.

The robot is configured to perform corresponding operations under the control of the control device.

In addition, this embodiment further provides a computer product. When instructions in the computer product are executed by a processor of a control device, the control device is enabled to execute the order processing methods of the first to fourth embodiments.

Those skilled in the art can easily figure out other implementation solutions of the present disclosure after considering the specification and practicing the embodiments of the present disclosure disclosed herein. The present disclosure is intended to cover any variations, use, or adaptive changes of the present disclosure. These variations, use, or adaptive changes comply with general principles of the embodiments of the present disclosure, and include common general knowledge or common technical means in the technical field that are not disclosed in the embodiments of the present disclosure. The specification and embodiments are merely considered to be exemplary, and the actual scope and spirit of the embodiments of the present disclosure are pointed out in the following claims.

It should be understood that the embodiments of the present disclosure are not limited to the precise structures described above and shown in the accompanying drawings, and various modifications and changes can be made without departing from the scope of the present disclosure. The scope of the embodiments of the present disclosure is limited only by the attached claims.

What is claimed is:

1. An order processing method, comprising:

obtaining a target order to be processed;

determining a quantity of types of goods in the target order;

dividing the target order into a plurality of sub-orders according to the quantity of types of goods;

assigning different workstations for the sub-orders;

sending the sub-orders for which the workstations have been assigned to the corresponding workstations for processing;

after sending the sub-orders, receiving sorting information of a sub-order for which picking of goods has been performed, wherein the sorting information has been sent by a first workstation after the goods corresponding to the sub-order for which picking has been performed have been picked in a first box, and wherein the first workstation is a workstation corresponding to the sub-order for which picking has been performed and the first box is a box for storing the goods corresponding to the sub-order for which picking has been performed; and causing a corresponding robot to complete delivery of the picked goods according to the sorting information of the sub-order for which picking has been performed.

2. The method according to claim 1, wherein the dividing the target order into a plurality of sub-orders according to the quantity of types of goods comprises:

determining the quantity of types of goods as a quantity of sub-orders; and dividing the target order into the plurality of corresponding sub-orders according to the quantity of sub-orders.

3. The method according to claim 1, wherein the sorting information of the sub-order for which picking has been performed comprises picking completed information of the goods corresponding to the sub-order for which picking has been performed; and wherein causing the corresponding robot to complete delivery of the picked goods comprises:

determining, according to the picking completed information, a mark of the sub-order for which picking has been performed;

determining, according to the mark of the sub-order for which picking has been performed, whether there is a sub-order for which picking has not been performed in the target order; and in response to determining that there is no sub-order for which picking has not been performed, causing the robot to complete the delivery of the picked goods.

4. The method according to claim 3, wherein the causing the corresponding robot to complete the delivery of the picked goods comprises:

determining, according to the mark of the sub-order for which picking has been performed, a grid corresponding to the sub-order for which picking has been performed;

generating a corresponding delivery instruction according to the grid; and sending the delivery instruction to the robot, so that the robot transports the goods to the grid.

5. The method according to claim 3, wherein in response to determining that there is a sub-order for which picking has not been performed, the method further comprises:

determining a second workstation to which the robot needs to move and corresponding to the sub-order for which picking has not been performed, wherein the second workstation is a workstation corresponding to the sub-order for which picking has not been performed; and causing the robot to move to a waiting region of the corresponding second workstation.

6. The method according to claim 5, wherein there are a plurality of sub-orders for which picking has not been performed; and wherein the determining a second workstation to which the robot needs to move and corresponding to the sub-order for which picking has not been performed comprises:

determining predicted periods of picking corresponding to goods in the plurality of sub-orders for which picking has not been performed; and determining, according to the predicted periods of picking, the second workstation to which the robot needs to move and corresponding to the sub-order for which picking has not been performed.

7. The method according to claim 6, wherein after causing the corresponding robot to move to the waiting region of the corresponding second workstation, the method further comprises:

after receiving sorting information corresponding to the sub-order for which picking has not been performed sent by the second workstation, causing the robot to move from the waiting region of the second workstation to a goods receiving region of the second workstation, wherein the sorting information of the sub-order for which picking has not been performed is sent when goods corresponding to the sub-order for which picking has not been performed are being picked.

8. The method according to claim 6, wherein the determining, according to the predicted periods of picking, the second workstation to which the robot needs to move and corresponding to the sub-order for which picking has not been performed comprises:

determining a minimum predicted period of picking among the predicted periods of picking; and determining a second workstation of a sub-order for which picking has not been performed corresponding to the minimum predicted period of picking as the second workstation to be moved to and corresponding to the sub-order for which picking has not been performed.

9. The method according to claim 8, wherein the determining a second workstation of a sub-order for which picking has not been performed corresponding to the minimum predicted period of picking as the second workstation to be moved to and corresponding to the sub-order for which picking has not been performed comprises:

comparing the minimum predicted period of picking and a preset picking period threshold; and in response to determining that the minimum predicted period of picking is less than the preset picking period threshold, determining the second workstation of the sub-order for which picking has not been performed corresponding to the minimum predicted period of picking as the second workstation to be moved to and corresponding to the sub-order for which picking has not been performed.

10. The method according to claim 9, wherein after the comparing the minimum predicted period of picking and a preset picking period threshold, the method further comprises:

in response to determining that the minimum predicted period of picking is greater than or equal to the preset picking period threshold, performing the step of determining, according to the mark of the sub-order for which picking has been performed, a grid corresponding to the sub-order for which picking has been performed.

11. A control device, comprising:

a memory configured to store executable instructions; and a processor configured to implement the instructions stored in the memory, wherein the instructions comprise:

obtaining a target order to be processed;

determining a quantity of types of goods in the target order;

dividing the target order into a plurality of sub-orders according to the quantity of types of goods;

assigning different workstations for the sub-orders;

sending the sub-orders for which the workstations have been assigned to the corresponding workstations for processing;

after sending the sub-orders, receiving sorting information of a sub-order for which picking of goods has been performed, wherein the sorting information has been sent by a first workstation after the goods corresponding to the sub-order for which picking has been performed have been picked in a first box, and wherein the first workstation is a workstation corresponding to the sub-order for which picking has been performed and the first box is a box for storing the goods corresponding to the sub-order for which picking has been performed; and causing a corresponding robot to complete delivery of the picked goods according to the sorting information of the sub-order for which picking has been performed.

12. The device according to claim 11, wherein the sorting information of the sub-order for which picking has been performed comprises picking completed information of the goods corresponding to the sub-order for which picking has been performed; and wherein causing the corresponding robot to complete delivery of the picked goods comprises:

determining, according to the picking completed information, a mark of the sub-order for which picking has been performed;

determining, according to the mark of the sub-order for which picking has been performed, whether there is a sub-order for which picking has not been performed in the target order; and in response to determining that there is no sub-order for which picking has not been performed, causing the robot to complete the delivery of the picked goods.

13. The device according to claim 12, wherein the causing the robot to complete the delivery of the picked goods comprises:

determining, according to the mark of the sub-order for which picking has been performed, a grid corresponding to the sub-order for which picking has been performed;

generating a corresponding delivery instruction according to the grid; and sending the delivery instruction to the robot, so that the robot transports the goods to the grid.

14. The device according to claim 12, wherein in response to determining that there is a sub-order for which picking has not been performed, the instructions further comprise:

determining a second workstation to which the robot needs to move and corresponding to the sub-order for which picking has not been performed, wherein the second workstation is a workstation corresponding to the sub-order for which picking has not been performed; and causing the robot to move to a waiting region of the corresponding second workstation.

15. A non-transitory computer-readable storage medium comprising a computer program that is executable by a processor, the computer program comprising the following instructions:

obtaining a target order to be processed;

determining a quantity of types of goods in the target order;

dividing the target order into a plurality of sub-orders according to the quantity of types of goods;

assigning different workstations for the sub-orders;

sending the sub-orders for which the workstations have been assigned to the corresponding workstations for processing;

after sending the sub-orders, receiving sorting information of a sub-order for which picking of goods has been performed, wherein the sorting information has been sent by a first workstation after the goods corresponding to the sub-order for which picking has been performed have been picked in a first box, and wherein the first workstation is a workstation corresponding to the sub-order for which picking has been performed and the first box is a box for storing the goods corresponding to the sub-order for which picking has been performed; and causing a corresponding robot to complete delivery of the picked goods according to the sorting information of the sub-order for which picking has been performed.

16. The non-transitory computer-readable storage medium according to claim 15, wherein the sorting information of the sub-order for which picking has been performed comprises picking completed information of the goods corresponding to the sub-order for which picking has been performed; and wherein causing the corresponding robot to complete delivery of the picked goods comprises:

determining, according to the picking completed information, a mark of the sub-order for which picking has been performed;

determining, according to the mark of the sub-order for which picking has been performed, whether there is a sub-order for which picking has not been performed in the target order; and in response to determining that there is no sub-order for which picking has not been performed, causing the robot to complete the delivery of the picked goods.

17. The non-transitory computer-readable storage medium according to claim 16, wherein the causing the robot to complete the delivery of the picked goods comprises:

determining, according to the mark of the sub-order for which picking has been performed, a grid corresponding to the sub-order for which picking has been performed;

generating a corresponding delivery instruction according to the grid; and sending the delivery instruction to the robot, so that the robot transports the goods to the grid.

18. The non-transitory computer-readable storage medium according to claim 16, wherein in response to determining that there is a sub-order for which picking has not been performed, the instructions further comprise:

determining a second workstation to which the robot needs to move and corresponding to the sub-order for which picking has not been performed, wherein the second workstation is a workstation corresponding to the sub-order for which picking has not been performed; and causing the robot to move to a waiting region of the corresponding second workstation.

19. The method according to claim 3, wherein the dividing the target order into a plurality of sub-orders according to the quantity of types of goods comprises:

determining the quantity of types of goods as a quantity of sub-orders; and dividing the target order into the plurality of corresponding sub-orders according to the quantity of sub-orders.

20. The device according to claim 11, wherein the dividing the target order into a plurality of sub-orders according to the quantity of types of goods comprises:

determining the quantity of types of goods as a quantity of sub-orders; and dividing the target order into the plurality of corresponding sub-orders according to the quantity of sub-orders.

21. The non-transitory computer-readable storage medium according to claim 15, wherein the dividing the target order into a plurality of sub-orders according to the quantity of types of goods comprises:

determining the quantity of types of goods as a quantity of sub-orders; and dividing the target order into the plurality of corresponding sub-orders according to the quantity of sub-orders.

* * * * *